United States Patent
Findikli

(10) Patent No.: US 6,282,419 B1
(45) Date of Patent: Aug. 28, 2001

(54) APPARATUS AND METHOD FOR MOBILE TERMINAL RESCANS DURING ROAMING

(75) Inventor: Nadi Sakir Findikli, Cary, NC (US)

(73) Assignee: Ericsson INC, Research Triangle Park, NC (US)

(*) Notice: Subject to any disclaimer, the term of this patent is extended or adjusted under 35 U.S.C. 154(b) by 0 days.

(21) Appl. No.: 08/915,438

(22) Filed: Aug. 20, 1997

(51) Int. Cl.$^7$ .................................................. H04Q 7/20
(52) U.S. Cl. ................................. 455/434; 455/464
(58) Field of Search ..................... 455/423, 434, 455/432, 436, 455, 464, 31.2, 32.1, 67.1, 67.4, 425, 403, 447, 453, 466, 426, 450, 452

(56) References Cited

U.S. PATENT DOCUMENTS

| | | | |
|---|---|---|---|
| 4,013,958 | * 3/1977 | Spayth | 455/32.1 |
| 4,264,976 | * 4/1981 | Yamashita | 455/169.2 |
| 5,539,748 | * 7/1996 | Raith | 455/38.3 |
| 5,566,225 | * 10/1996 | Haas | 455/423 |
| 5,754,944 | * 5/1998 | Dominiak et al. | 455/32.1 |

FOREIGN PATENT DOCUMENTS

| | | |
|---|---|---|
| 0 283 955 A2 | 3/1988 | (EP) . |
| 0 352 786 A2 | 7/1989 | (EP) . |
| 0 603 049 A1 | 12/1993 | (EP) . |
| 2 248 749 | 8/1991 | (GB) . |

* cited by examiner

Primary Examiner—Dwayne D. Bost
Assistant Examiner—Jean A Gelin
(74) Attorney, Agent, or Firm—Jenkens & Gilchrist

(57) ABSTRACT

An apparatus and method for improving the rescan capability of a telecommunications system searching for an Acceptable Service Provider (ASP) after a failure by a given mobile terminal to link with the ASP. After a mobile terminal's communication link with an ASP has been severed or during startup, i.e., whenever the ASP is temporarily unavailable, a mobile terminal, now camped upon an Unacceptable Service Provider, performs one or more partial rescans to re-establish contact with the ASP before performing a full power-up rescan.

25 Claims, 4 Drawing Sheets

APPARATUS AND METHOD FOR MOBILE TERMINAL RESCANS DURING ROAMING

FIELD OF THE INVENTION

The present invention relates generally to a telecommunications system, particularly, to a telecommunications system, apparatus and method for improved scanning by a roaming mobile terminal for acceptable service providers, and, more particularly, to an improved mobile terminal and method for shortening the scan time for a roaming mobile terminal to find an acceptable service provider when camped upon on unacceptable service provider.

BACKGROUND AND OBJECTS OF THE PRESENT INVENTION

The evolution of wireless communication over the past century, since Guglielmo Marconi's 1897 demonstration of radio's ability to provide continuous contact with ships sailing the English Channel, has been remarkable. Since Marconi's discovery, new wireline and wireless communication methods, services and standards have been adopted by people throughout the world. This evolution has been accelerating, particularly over the last ten years, during which the mobile radio communications industry has grown by orders of magnitude, fueled by numerous technological advances that have made portable radio equipment smaller, cheaper and more reliable. The exponential growth of mobile telephony will continue to rise in the coming decades as well, as this wireless network interacts with and eventually overtakes the existing wireline networks.

With reference now to FIG. 1 of the drawings, there is illustrated a Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) 20 may move freely without having to send update location information to the MSC/VLR area 12 that controls that LA 18. Each Location Area 12 is divided into a number of cells 22. Mobile Station (MS) 20 is the physical equipment, e.g., a car phone or other portable phone, used by mobile subscribers to communicate with the cellular network 10, each other and other wireline and wireless users outside the network 10. A Base Station (BS) 24 is the physical equipment, illustrated for simplicity as a radio tower, that provides radio coverage to the geographical area of the cell 22 in which to handle radio traffic to and from the MS 20.

With further reference to FIG. 1, the PLMN Service Area or cellular network 10 includes a Home Location Register (HLR) 26, which is a database maintaining all subscriber information, e.g., user profiles, current location and routing information, International Mobile Subscriber Identity (IMSI) numbers, and other administrative information. The HLR 26 may be co-located with a given MSC 14, an integral part of the MSC 14 or service multiple MSCs 14, the latter of which is illustrated in FIG. 1.

The VLR 16 is a database containing information about all of the mobile stations 20 currently located within the MSC/VLR area 12. If a mobile station 20 roams into a new MSC/VLR area 12, the VLR 16 connected to that MSC 14 will request data about that mobile station 20 from the HLR database 26 (simultaneously informing the HLR 26 about the current location of the mobile station 20). Accordingly, if the user of the mobile station 20 then wants to make a call, the local VLR 16 will have the requisite identification information without having to reinterrogate the HLR 26.

In the aforedescribed manner, the VLR and HLR databases 16 and 26, respectfully, contain various subscriber information associated with a given mobile station 20. It should be understood that while the MS 20 user remains within the confines of the subscribed network, i.e., the cellular network 10, all services may be handled by the subscribed network. As the MS 20 travels or roams into different networks, i.e., different PLMNs 10, the neighboring network operators can provide similar services to the MS 20 user. Frequently, Service Providers (SP) of the PLMNs 10 cooperate with each other in an effort to offer their respective subscribers a coverage area much wider than any one of them could do on their own. As is understood in this area, administrative issues like charging, subscription agreements and other details must be solved between the different operators or SPs, in addition to the technical details to make the roaming possible, e.g., transfers of location data between networks, the existence of a common access interface, etc.

Unfortunately, not all such Service Providers are acceptable to a roaming MS 20. Indeed, under current requirements for Personal Communications Services (PCS) phones, an SP may be designated in various ways: as a home_provider_owned (home) service; a partner SP, with which the home provider has negotiated for superior subscriber services and rates; a favored SP, which is similar to the aforedescribed partner SP status, except the service area of the favored SP overlaps the service area of the home SP; a forbidden SP is a Service Provider that a roaming subscriber should never use, with the obvious exception of 911 services; and a neutral SP is one that is none of the other designations listed. Home and partner SP services have a higher priority than favored or neutral services.

In view of the above nomenclature, an Acceptable SP may be defined as a home or partner SP and an Unacceptable SP is favored or neutral. A forbidden SP does not enter this equation and is not considered, except as discussed in emergency situations. The actual mechanism for determining the acceptability of a detected SP involves comparing the SP's System Identification (SID) number and System Operator Code (SOC) against a home record of the home SID and SOC and against the respective lists of SIDs and SOCs for partner, favored and forbidden SPs, all of which may be stored in memory within the MS 20. Any SP that has no match is considered neutral.

While an MS 20 is roaming, particularly if following Intelligent Roaming (IR) protocols, the MS 20 must perform periodic triggered rescans of the available providers if not then camped on an Acceptable SP. As is understood in the art, a change in control channel triggers a scan and a control channel flag (CCH_FLAG) is utilized to monitor such changes. The periodicity of the scan is preferably stored within an IR database 21 stored within a memory module 20A within the MS 20, as shown in FIG. 2.

A problem arises when the MS 20 inadvertently camps on a Non-Acceptable SP while an Acceptable SP is present but was temporarily not accessible. This could happen for a variety of reasons. For example, the Acceptable SP is temporarily not seen by the MS 20 due to transient radio frequency (RF) conditions such as signal blockage or shading due to buildings or natural obstructions. Another instance is where the MS 20 is in an area where no system, Acceptable or not, are seen, e.g., a metal elevator car. Although all systems become simultaneously available, i.e., upon opening the elevator door, the MS 20 during its scan protocol may have already marked the particular band for the Acceptable SP as empty (before the door opened) just prior to scanning the band of the Unacceptable SP.

Since a conventional rescan timer 28, also within said MS 20, as illustrated in FIG. 2, generally waits approximately 15–20 minutes before reinitiating another scan, with the minimum wait being approximately 6 minutes, 24 seconds (300 hyperframes), this is too long a time for the user to wait in order to find the now-accessible Acceptable SP. Since most experienced users know that they should have acceptable service in a given area, they may accept the inconvenience of a temporary, i.e., on the order of seconds, loss of service with the Acceptable SP. Six or more minutes of inconvenience, however, is a far different matter, and the user will perceive that the MS 20 is permanently on the wrong SP. It has been discovered that an obvious solution, shortening the duration of the timer 28, is generally not feasible because this results in degraded page performance, i.e., the MS 20 cannot receive pages while it is doing a triggered scan.

Also, it is desired to avoid excessive scanning of available frequencies if the MS 20 is stationary since if an Acceptable SP has not been found, there is no need to retry until going to a new location.

It is, accordingly, an object of the present invention to provide a system and method for improved rescanning by an MS 20 for an available and Acceptable Service Provider.

It is also an object of the present invention to provide an improved apparatus and method for shortening the time a mobile terminal takes to rescan for an Acceptable Service Provider.

It is a further object of the present invention to provide an improved apparatus and method for performing successive scans by the mobile terminal after failure to find an Acceptable SP.

It is a still further object of the present invention to prevent excessive rescanning by the mobile terminal.

SUMMARY OF THE INVENTION

The present invention is directed to an apparatus and method for improving the rescan capability of a telecommunications system searching for an Acceptable Service Provider (ASP) after a failure by a given mobile terminal to link with the ASP. After a mobile terminal's communication link with an ASP has been severed or during startup, i.e., whenever the ASP is temporarily unavailable, a mobile terminal, now camped upon an Unacceptable Service Provider, performs one or more partial rescans to re-establish contact with the ASP before performing a full power-up rescan.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PRESENT INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Since permanent adjustment of the timer 28 periodicity has adverse consequences in system performance, e.g., the aforementioned paging degradation, the solution set forth in present invention is to make a more feasible timer 28 adjustment to better address the scenario where an Acceptable SP is inadvertently overlooked. In particular, the timer 28 in accordance with the present invention operates by shortening the triggered rescan timer 28, not permanently, but temporarily upon the first instance of the MS 20 camping on an Unacceptable SP.

Figure 1:
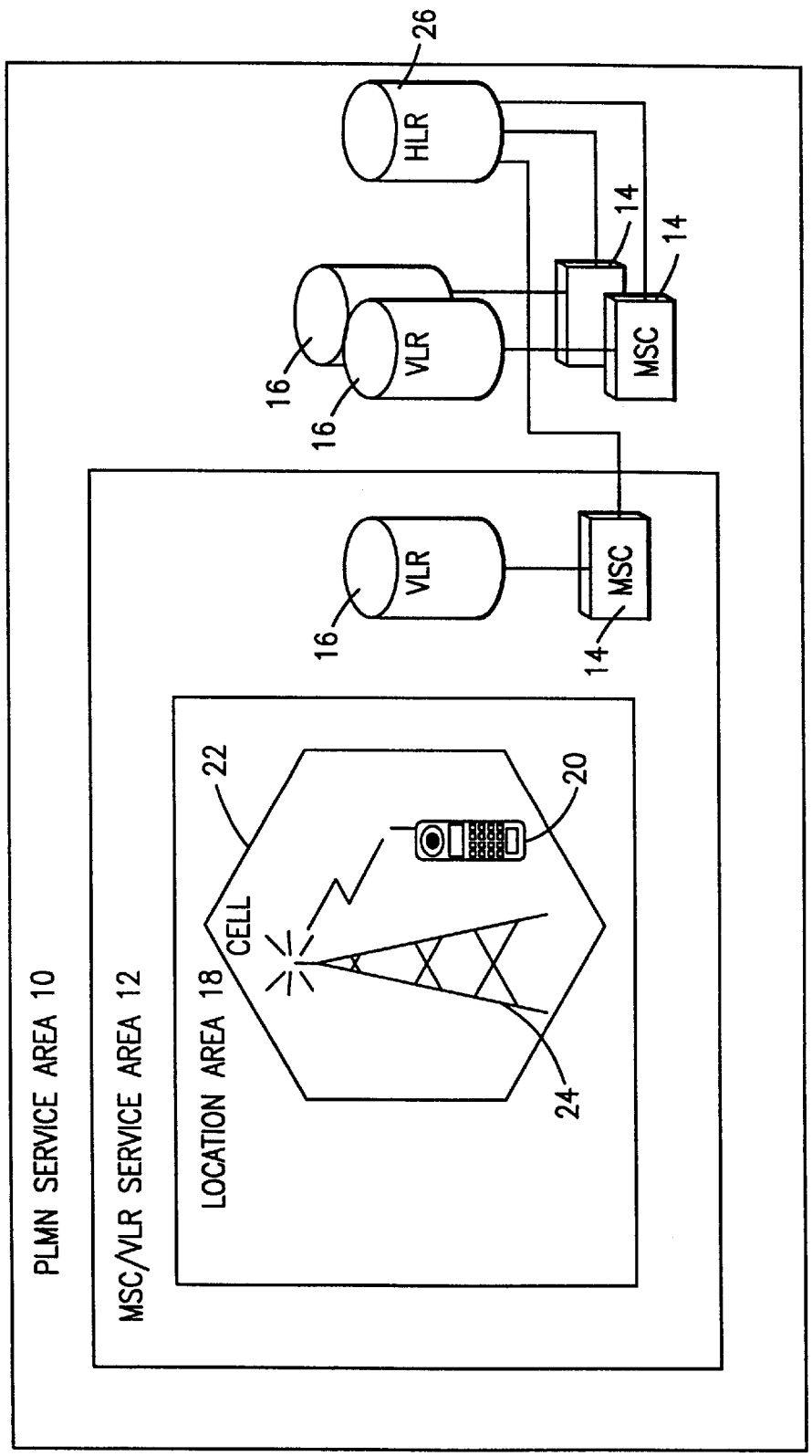
FIG. 1 is a block diagram of a conventional telecommunications system.
Figure 2:
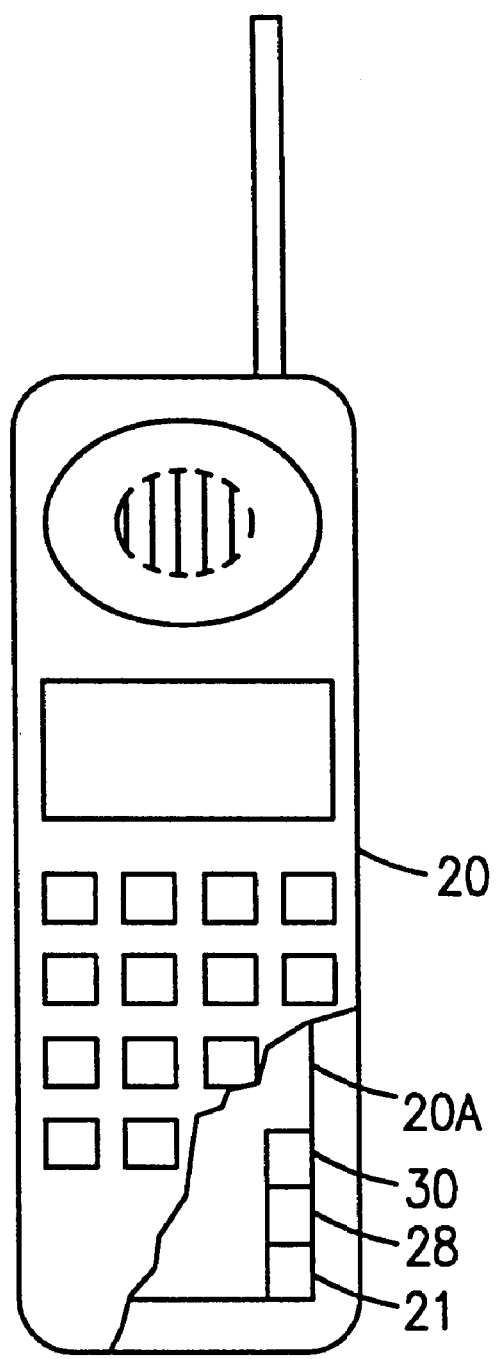
FIG. 2 is a sectional view of a mobile terminal in accordance with the present invention.

It should be understood that both the normal length of time for timer 28, generally on the order of many minutes, and the shortened length of time, generally on the order of seconds, may be stored within the memory module 20A within the MS 20, for example, within the aforedescribed IR database 21 or separately, as illustrated in FIG. 2. The shortened period of time for rescanning in accordance with the present invention can be determined in various ways. First, the shortened time period may be predetermined and stored within the memory 20A or IR database 21 at subscription time or modified thereafter by appropriate control signals to the MS 20. Second, the shortened time period may be a function of the normal time period, a relationship which may also be stored within the MS 20. For example, the shortened rescan time period may be one fourth that of the normal amount stored, e.g., 4 minutes (of 16). It should further be understood that the value of the computed shortened time period may be stored within the MS 20 or a multiplier, e.g., 0.25, may be stored therein or elsewhere in memory 20A for dynamic calculation. It should additionally be understood that additional variables may be added to assist in such calculations of the desired, shortened, triggered rescan time.

A function defining the shortened rescan time as a fraction of the normal rescan time is preferably a compromise between accuracy and download size, as is understood in the art. At one extreme is using only one bit and allowing only $\frac{1}{2}$ and $\frac{2}{2}$ as the available fractions. If, however, a moderate amount of download bandwidth is used to define a four-bit value, the fraction would be in the range $\frac{1}{16}$ to $\frac{16}{16}$ in $\frac{1}{16}$ increments. If more download bandwidth is used to define an eight-bit value, the fraction would be in the range $\frac{1}{256}$ to $\frac{256}{256}$ in $\frac{1}{256}$ increments. Although the utilization of additional bits is at present not preferred and may currently be considered a waste of bandwidth, it should nonetheless be understood that n bits may be utilized in the determination of the shortened rescan time where future, finer timing granularities below $\frac{1}{256}$ are desired.

It should also be understood that additional functuality must be added to the MS 20 in order to implement the features of the present invention. In a presently preferred embodiment, a flag 30, referenced to herein as a quick trigger flag, resides within the MS 20, for example, within the IR database 21 or separately, as illustrated in FIG. 2. The quick trigger flag 30, when set or enabled, indicates that the triggered rescan timer 28, governing the length of time for rescans, should be shortened from the normal or default length of time indicated within the MS 20.

As will be further discussed hereinafter, the quick trigger flag 30 is preferably set to an enabled status at MS 20 power up and whenever an Acceptable SP is thereafter camped upon, indicating the availablity of this timer 28 shortening feature during initialization or after the Acceptable SP connection is lost. When an Unacceptable SP has been camped upon, e.g., in the aforedescribed case where the roaming MS 20 is temporarily unable to camp upon an appropriate SP, however, the shortened time, either stored within the IR database 21 or elsewhere in memory 20A or computed, is utilized within the timer 28 and that rescan time is utilized if the flag 30 is enabled. If flag 30 is disabled, e.g., after an excessive number of unsuccessful short rescan attempts have been made, the normal rescan time is run.

Figure 3A:
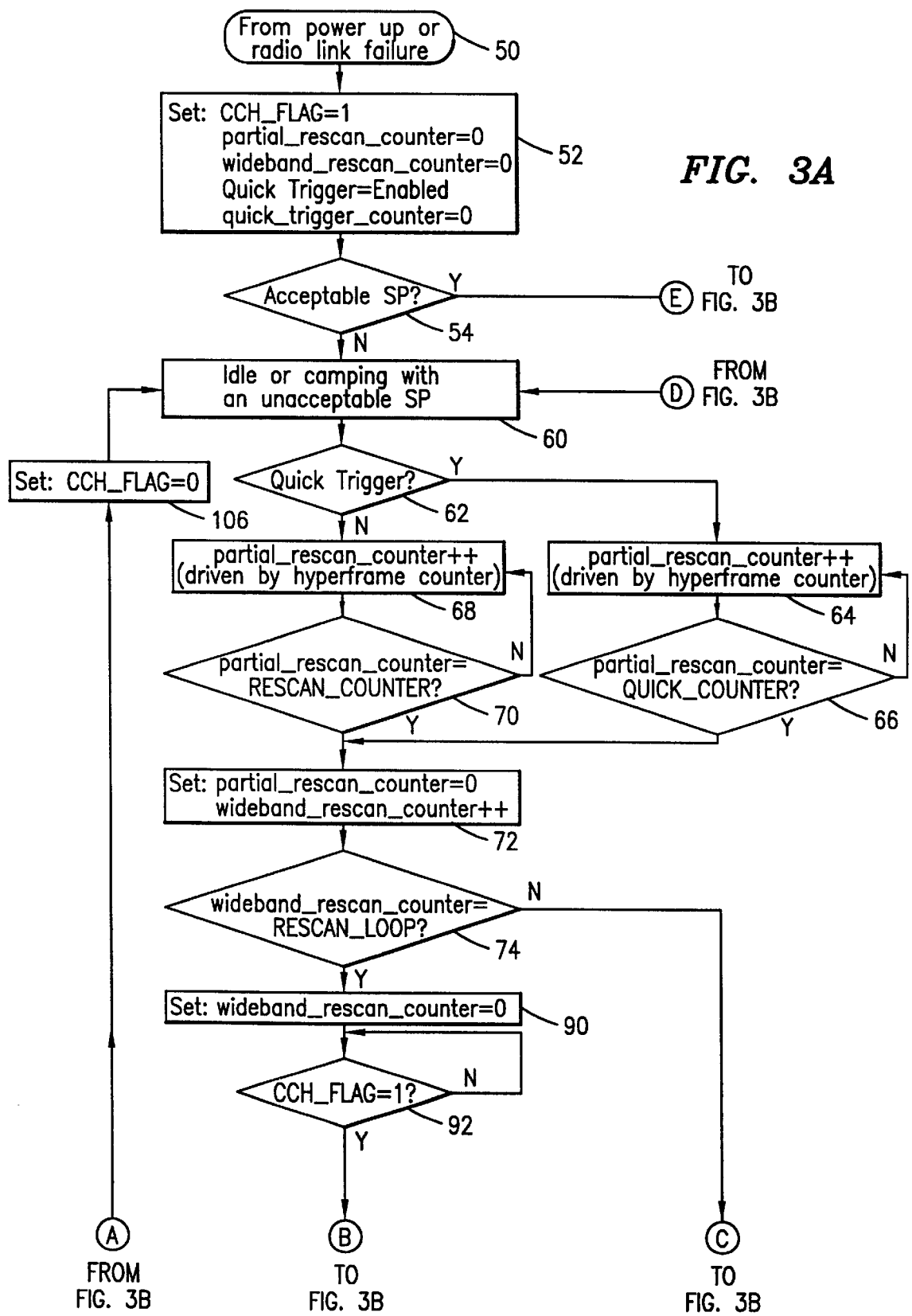
FIGS. 3A and 3B are flowchart representations of steps utilized in practicing the method of the present invention, using the system and apparatus shown in FIGS. 1 and 2.
Figure 3B:
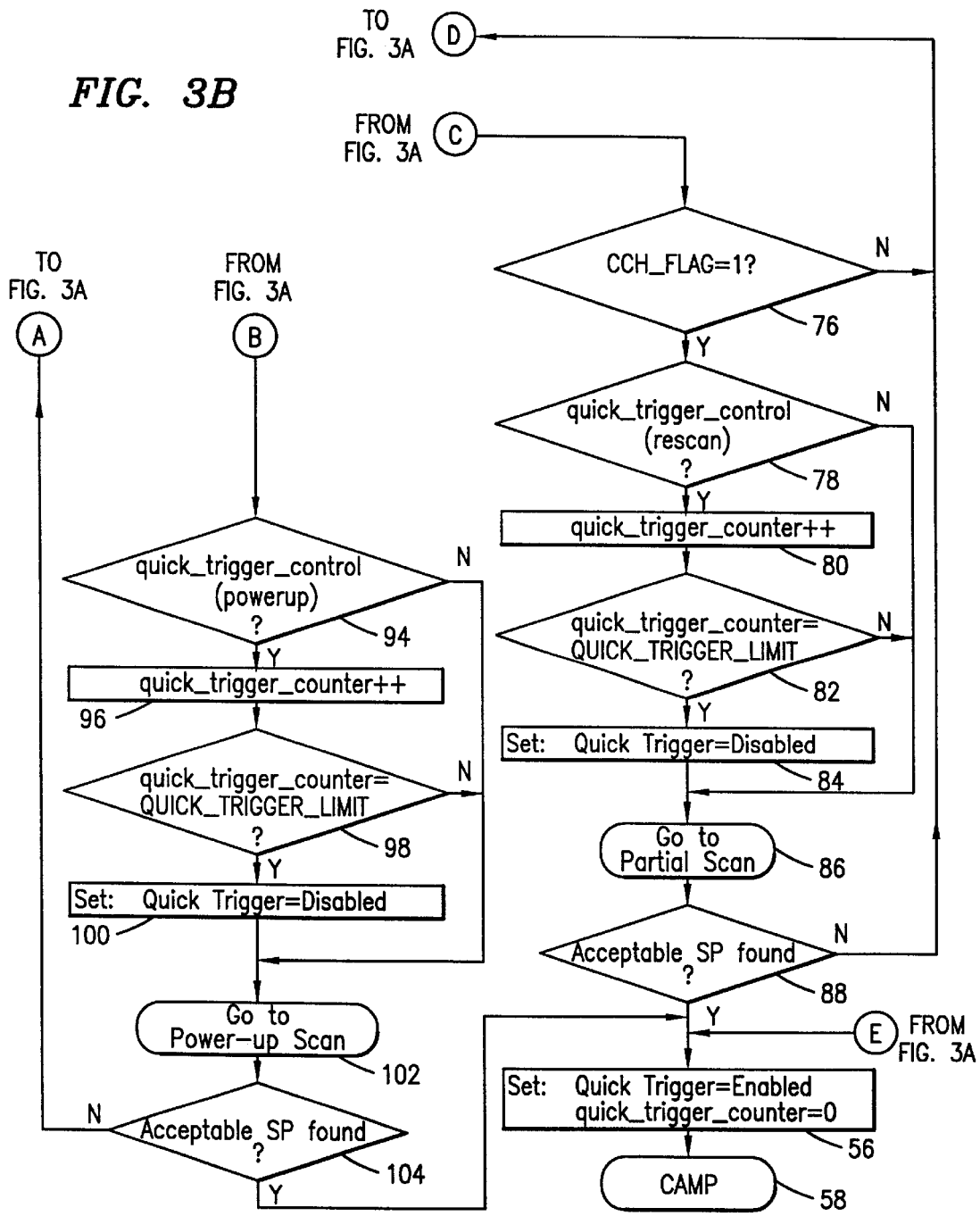

With reference now to FIGS. 3A and 3B, collectively referred to herein as FIG. 3, there is illustrated a flowchart for implementing aspects of the present invention as described. From an initial point 50, reached from the power up of the MS 20 or a radio link failure encountered by the MS 20, various flags and conditions are initialized (box 52). In particular, the aforementioned CCH_FLAG is set, the variables partial_rescan_counter and wideband_rescan_ counter are initialized, the quick trigger flag 30 is enabled and a quick_trigger_counter is initialized. If the MS 20 has properly selected an Acceptable SP (box 54), as determined by consulting the aforementioned home record and respective lists of SIDs and SOCs for partner, favored and forbidden SPs preferably stored within memory module 20A in the MS 20, then control is transferred to box 56 where the quick trigger flag 30 is again enabled, as a result of the other pathways to box 56 discussed further herein. The MS 20 then camps upon the proper SP for further communications through the new SP's system (box 58).

If, however, in box 54 it is determined that the MS 20 is camped (or idle) upon an Unacceptable SP (box 60), then control is transferred to box 62 where a determination is made whether the quick trigger flag 30 (Quick Trigger) has been enabled. If yes, then the partial_rescan_counter is incremented (box 64) and a shortened time period for the rescan, as discussed and determined hereinabove, is applicable. As is understood by those skilled on the art, the particular value of the shortened time period is driven by a hyperframe counter, such as used within a Time Division Multiple Access (TDMA) system 10, which provides a regular counting methodology to accurately measure and implement a timing mechanism.

Control is then transferred to box 66 where a determination is made whether the partial_rescan_counter, representing the number of hyperframes encountered, equals a fixed variable QUICK_COUNTER, representing a particular number of such iterative loops between boxes 64 and 66 corresponding to said shortened time period, i.e., hyperframes, after which an Acceptable SP initially unavailable may become available. The particular value for QUICK_COUNTER, fixed for that rescan attempt, is preferably stored in a high-speed memory, e.g., RAM, within memory 20A for quicker access in comparing the value stored therein to the incrementing partial_rescan_counter value, also preferably stored in RAM. If, however, the partial_rescan_counter fails to equal QUICK_COUNTER, then the partial_rescan_counter is incremented again (box 64), such incrementation continuing until the values are equal, i.e., the desired shortened time period has elapsed, at which point control is transferred to box 72, discussed further hereinbelow.

If, however, the quick trigger flag 30 has not been enabled (box 62), then partial_rescan_counter is incremented (box 68) repeatedly (box 70), as with boxes 64 and 66, until the partial_rescan_counter equals another fixed variable, RESCAN_COUNTER, which represents another particular number of iterative loops (hyperframes) between boxes 68 and 70, corresponding to the normal non-shortened time period for rescans.

It should be understood that the determination of the actual values for the "fixed" variables QUICK_COUNTER and RESCAN_COUNTER are usually determined empirically and represent a tradeoff between paging performance degradation and user annoyance at not finding the correct SP. System operators, through experience, determine these values in attempting to optimize overall system performance.

Upon reaching equivalence with the respective fixed variables (boxes 66 and 70), the partial_rescan_counter is again initialized and the wideband_rescan_counter, initialized earlier (box 52), is incremented (box 72). Control is then transferred to box 74 where a determination is made whether the wideband_rescan_counter equals RESCAN_ LOOP, another variable, representing a maximum number of tries to perform the shortened rescan before performing a full rescan sequence, as discussed in more detail below.

It should be understood that the partial_rescan_counter and the wideband_rescan_counter serve several purposes in the present invention. First, regarding triggered scans, the MS 20 does two types of such scans: a triggered partial scan where the MS 20 scans only the band of the last known public Acceptable SP; and a triggered power-up scan where the MS 20 starts from the beginning as if it were just powered up and scanning all of the bands. The two aforementioned rescan variables, RESCAN_COUNTER and RESCAN_LOOP, and the two counters corresponding thereto, partial_rescan_counter and wideband_rescan_ counter, operate as follows:

(1) The MS 20 performs a triggered partial scan every RESCAN_COUNTER hyperframes; and (2) The MS 20 performs a triggered power-up scan every RESCAN_LOOP triggered partial scans.

For example, where RESCAN_COUNTER=300 and RESCAN_LOOP=4, the MS 20 performs a triggered scan of one form or another every 300 hyperframes (6 minutes, 24 seconds), particularly, 3 partial scans followed by one power-up scan. It should further be understood, however, that the shortened time period (partial scan) is used for the triggered scans until a predetermined number of triggered partial rescans or triggered power-up scans are performed, as described hereinafter, after which point the normal time period is used, i.e., the quick trigger flag 30 is disabled.

Accordingly, implementation of the above sequence is also illustrated in FIG. 3, where if the wideband_rescan_ counter fails to equal RESCAN_LOOP (box 74), indicating that the maximum number of triggered partial scans has not yet been reached, control is transferred to box 76, otherwise it is now time for a full power-up scan and control transfers to box 90, discussed further hereinafter.

If the wideband_rescan_counter does not equal the RESCAN_LOOP value (box 74), then control is transferred to box 76 where a determination is made whether the CCH_FLAG remains set. It should be understood that one function of the CCH_FLAG is to prevent the MS 20 from performing excessive scanning by being cleared (set to zero) after the triggered powerup scan. Also, it is desirable for the MS 20 to avoid excessive scanning of available frequencies when stationary. Only if all scanning and rescanning algorithms have been exhausted without finding an Acceptable SP can the MS 20 safely assume that there are no Acceptable SPs in its current location. Accordingly, the MS 20 may stop performing triggered rescans until its location changes (box 106). Since a cell 22 is the primary unit of location, the MS 20 may, therefore, use any change in Control Channel, i.e., cell 22, as an indication of location change. As discussed further hereinafter, the MS 20 may re-enable triggered scans if it uses a different Control Channel.

If the CCH_FLAG is so set (box 76), then the value of a quick_trigger_control flag is set checked (box 78). The quick_trigger_control flag determines which event disables the quick trigger, partial or powerup. If it is determined that partial rescans control quick scanning, the control transfers to box 80; otherwise control transfers to box 86, discussed further herein. In box 80, the quick_trigger_counter is incremented and a determination is then made (box 82) whether the value of the quick_trigger_counter equals a QUICK_TRIGGER_LIMIT. If such equivalence is attained (box 82), indicating that a sufficient number of the controlling events (partial rescans in this instance) have occurred, then the quick trigger flag 30 is disabled (box 84) and control transfers to box 86; otherwise, control reverts to box 86 also.

A triggered partial scan is then performed (box 86) in an attempt to locate the aforementioned previously temporarily unavailable Acceptable SP and a determination is made whether such an Acceptable SP has been found (box 88) during the partial scan. If yes, the aforementioned quick trigger flag 30 is enabled (box 56), in order to allow quick scans to be used in the event this Acceptable SP is lost and an Unacceptable SP is found, and the MS 20 camps (box 58), as described hereinbefore.

It should be understood that the CCH_FLAG, used to control excessive scanning if the MS 20 is not moving, is cleared or set to zero after the triggered powerup scan (box 102). The underlying reasoning is that if all the bands have been scanned, and no Acceptable SP has been found, then there is no need to try further partial scans until the MS 20 moves to another area, i.e., another control channel in another cell. Thus, if in box 76 it is determined that the CCH_FLAG has not been set, indicating the desire to prevent excessive scanning for a stationary MS 20, then control reverts back to box 60 for further processing as described hereinabove. Also, if in box 88 an Acceptable SP has not been found after the partial rescan (box 86), then control is also transferred back to box 60 for further processing. After a number of such failures to camp onto an Acceptable SP, the incrementing wideband_rescan_counter eventually equals RESCAN_LOOP (box 74).

When the wideband_rescan_counter finally equals RESCAN_LOOP (box 74), the wideband_rescan_counter is initialized (box 90), indicating that after this full power-up rescan the triggered partial scans may again be performed, and control is transferred to box 92 where, as in box 76, a determination is made whether the CCH_FLAG is set. If not, the MS 20 stalls and waits for the control channel flag to be set to one by a change in control channel. It should, of course, be understood that the other features of the MS 20, e.g., air interface, call processing, user interface, etc., are running independently of the triggered scan processing. It should, therefore, be understood that the flowchart in FIG. 3 does not control the processing of the mobile 20 except for the limited functionality of triggered rescanning. There are other factors which affect triggered rescans also. While this flowchart is being driven by a timer or hyperframe counter, the mobile is continuing to change control channels as prescribed by the reselection process described in IS-136. Any time the mobile goes to a new control channel, the CCH_FLAG is set, regardless of where the mobile is on this flowchart. Additionally, if the mobile reselects to an Acceptable SP, then it aborts this process all together and moves to box 58.

When the CCH_FLAG is so set (box 92), then as in box 78, the value of the aforementioned quick_trigger_control flag is set checked (box 94). If it is determined that powerup rescans control quick scanning, then the quick_trigger_counter is incremented (box 96) and control transferred to box 98; otherwise, control reverts to box 102, discussed further hereinafter. In box 98, a determination is made whether the value of the quick_trigger_counter equals the aforedescribed QUICK_TRIGGER_LIMIT. As in box 82, if such equivalence is attained (box 98), indicating that a sufficient number of controlling events (powerup rescans in this instance) have occurred, then the quick trigger flag 30 is disabled (box 100) and control then shifts to box 102, as discussed and at which point, a full power-up scan is performed (box 102) in a further effort to find an Acceptable SP. If found (box 104), control transfers to box 56, where the quick trigger flag 30 is enabled, in order to allow quick scans to be used in the event this Acceptable SP is lost and an Unacceptable SP is found, and the MS 20 camps (box 58) as described above. If an Acceptable SP has not been found (box 104), the CCH_FLAG is set to zero (box 106) and control transferred back to box 60, for further processing as set forth hereinabove.

The previous description is of preferred embodiments for implementing the invention, and the scope of the invention should not necessarily be limited by this description. The scope of the present invention is instead defined by the following claims.

What is claimed is:

1. In a mobile terminal within a cellular system, a method for establishing communication by the mobile terminal with an acceptable service provider for the cellular system, said method comprising the steps of:
   (a) setting a quick trigger flag within said mobile terminal upon the loss of communication with a first said acceptable service provider;
   (b) waiting a shortened scan time period before said mobile terminal attempts to establish contact with said first or another acceptable service provider; and
   (c) performing, by said mobile terminal, after said waiting, a scan to attempt establishing said communication with said first or another acceptable service provider, wherein steps (b) and (c) are repeated a multiplicity of times, step (c) in each said repetition being a scan to re-establish contact of said mobile terminal with said first acceptable service provider.

2. The method according to claim 1, wherein the scan performed is a partial scan to re-establish contact of said mobile terminal with said first acceptable service provider.

3. The method according to claim 1, wherein said scan performed is a power-up scan.

4. The method according to claim 1, wherein after said multiplicity of repetitions of steps (b) and (c), said mobile terminal waits said shortened scan time period in accordance with step (b), and the mobile terminal performs a power-up scan.

5. The method according to claim 4, wherein after said power-up scan, said quick trigger flag is disabled.

6. The method according to claim 1, wherein prior to step (a) said mobile terminal determines said shortened scan time period.

7. The method according to claim 6, wherein said mobile terminal computes said shortened scan time period from a standard scan time period, said shortened scan time period being a fraction of the standard scan time period.

8. The method according to claim 7, wherein said fraction is determined by an n-bit value stored within said mobile terminal.

9. The method according to claim 8, wherein n is within the range of 1 to 8.

10. The method according to claim 9, wherein n is within the range of 1 to 4.

11. The method according to claim 7, wherein said shortened scan time period is forwarded by said cellular system to said mobile terminal.

12. The method according to claim 7, wherein said shortened scan time period is stored within a scan timer in said mobile terminal and is a fraction of the standard scan time period, said shortened scan time period being computed by multiplying said standard scan time period by a multiplier.

13. The method according to claim 1, wherein prior to step (b) said mobile terminal determines said shortened scan time period.

14. The method according to claim 1, wherein said cellular system is a Time Division Multiple Access (TDMA) system and wherein said shortened scan time period is determined by a count of a multiplicity of hyperframes within said TDMA system.

15. The method according to claim 1, wherein prior to step (a) said mobile terminal is camped on an unacceptable service provider.

16. The method according to claim 1, wherein prior to step (a) said mobile terminal is powering up.

17. The method according to claim 1, further comprising the step of:
disabling said quick trigger flag after a given number of said scans, said mobile terminal including a scan mode flag therein for determining between a partial rescan and a powerup rescan, said quick trigger flag being disabled after a first multiplicity of said partial rescans or after a second multiplicity of said powerup rescans.

18. The method according to claim 17, wherein said scan mode flag is forwarded by said cellular system to said mobile terminal.

19. The method according to claim 17, wherein the number of said first multiplicity is forwarded by said cellular system to said mobile terminal.

20. The method according to claim 17, wherein the number of said second multiplicity is forwarded by said cellular system to said mobile terminal.

21. A mobile terminal within a cellular system, said mobile terminal being in communication with an acceptable service provider for said cellular system, said mobile terminal comprising:

a memory;

a quick trigger flag, stored within said memory, said flag when set indicating that a shortened scan time period is utilized when establishing contact with said acceptable service provider after said mobile terminal loses contact with said acceptable service provider, a standard scan time period being utilized when said flag is not set; and a scan timer, stored within said memory, said shortened scan time period being stored therein if said quick trigger flag is set, wherein after setting said quick trigger flag, said mobile terminal:
(a) waits said shortened scan time period before attempting to establish contact with said acceptable service provider,
(b) performs, after said shortened time period of waiting, a scan to attempt establishing contact with said acceptable service provider, and
(c) repeats steps (a) and (b) a number of times.

22. The mobile terminal according to claim 21, wherein said shortened scan time period stored within said scan timer is a fraction of the standard scan time period, said shortened scan time period being computed by multiplying said standard scan time period by a multiplier.

23. The mobile terminal according to claim 22, wherein said multiplier is stored within said memory.

24. The mobile terminal according to claim 22, wherein said multiplier is forwarded by said cellular system to said mobile terminal.

25. The mobile terminal according to claim 21, wherein said cellular system is a Time Division Multiple Access (TDMA) system and wherein said shortened scan time period is determined by a count of a multiplicity of hyperframes within said TDMA system.

* * * * *

UNITED STATES PATENT AND TRADEMARK OFFICE
CERTIFICATE OF CORRECTION

PATENT NO.    : 6,282,419 B1
DATED         : August 28, 2001
INVENTOR(S)   : Findikli It is certified that error appears in the above-identified patent and that said Letters Patent is hereby corrected as shown below:

<u>Title page,</u>
Item [56], References Cited, U.S. PATENT DOCUMENTS, please add the following:
-- 5,586,338 --

Signed and Sealed this

Eighth Day of July, 2003

JAMES E. ROGAN
*Director of the United States Patent and Trademark Office*